July 20, 1943.  W. H. MILLWOOD  2,324,944
ELECTRIC FLASH WELDING MACHINE
Filed Dec. 15, 1941
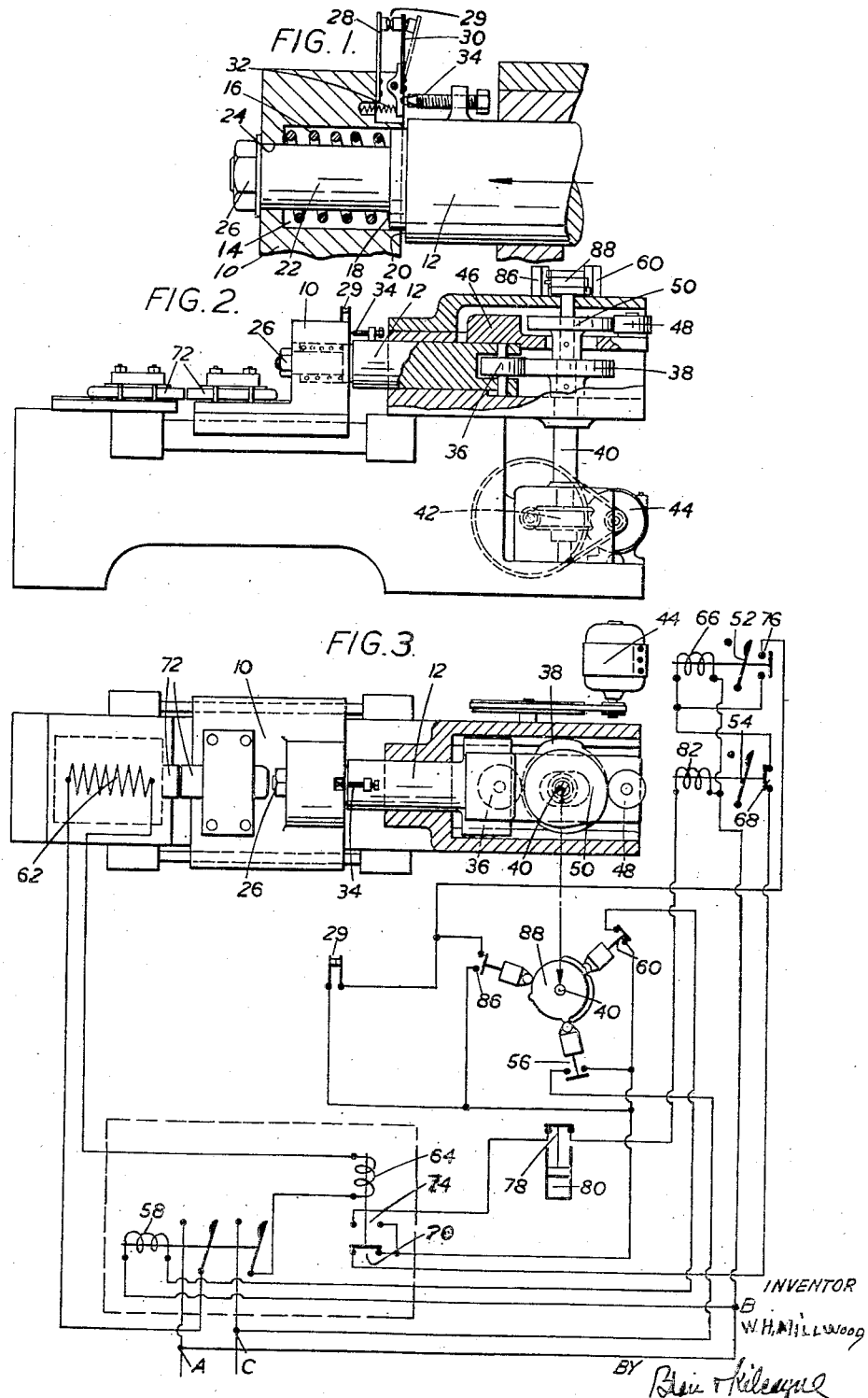

Patented July 20, 1943

2,324,944

UNITED STATES PATENT OFFICE 2,324,944

ELECTRIC FLASH WELDING MACHINE

William Hammond Millwood, Inverness, Scotland

Application December 15, 1941, Serial No. 423,113
In Great Britain December 17, 1940

3 Claims. (Cl. 219—4)

In welding by the "flashing" method the opposed surfaces of the two articles to be welded are brought together slowly (electric current being passed between them) so that when light contact is made sparking or arcing occurs which heats the articles locally. When the welding temperature is reached the two articles are pressed forcibly together and at the same time the electric current is cut off.

The preliminary heating of the articles by contact or by sparking or arcing is greatly increased if during the initial preheating stage of the flashing period the motion of approach is of a reciprocating character, consisting of alternations of motion, which alternations bring the articles into contact and strike arcs between the opposed surfaces, these contacts and arcs being renewed and also distributed over the whole of the surfaces.

It has been proposed to bring about this reciprocating movement by means of direct electromagnetic action working in opposition to springs, the current through the primary winding of the main transformer being passed through the winding of the electromagnetic means whereby when current flows through this winding as a result of the two articles making contact, the articles are immediately drawn apart thus breaking the current and enabling the opposed springs to bring the parts together again.

It has also been proposed to employ for this purpose the fluctuations of fluid pressure in fluid-operated feed mechanism which are brought about by the meeting together of the cold unsoftened workpieces. Thus, for example, when the forward feed movement is effected by a hydraulic ram, the pressure of the liquid will rise when the workpieces meet and this rise of pressure can be used to close a switch or operate a valve to cause the feed movement to be reversed momentarily, thereby separating the workpieces, the forward feed movement being resumed after a brief interval. These reversals of feed movement are repeated until the workpieces have become heated to a temperature at which flashing occurs, whereupon the rise of pressure does not occur and the forward movement continues uninterruptedly.

According to the present invention the stopping and reversal of feed movement occurs automatically as a result of the yielding of a resilient member interposed between the feed mechanism and the moving head, such yielding being a consequence of the mechanical resistance opposed by the meeting together of the workpieces. Thus the required reciprocating movements and the resumption of continuous forward feed movement when the flashing begins take place under the control of the physical condition of the workpieces themselves.

It will be appreciated that the advantages of this invention are obtained whatever the nature of the feed mechanism; it is not necessary to employ a hydraulic ram or a pneumatic cylinder and piston controlled by a liquid dashpot. It is in fact possible to apply the invention successfully to a machine in which the feed movement is effected by purely mechanical means, for example a screw and nut or cam mechanism.

An embodiment of the invention will now be described, as applied to a cam-operated welding machine, with reference to the accompanying drawing, in which:

Figure 1 is a side elevation, partly in section, of a part of the moving head of the welding machine;

Figure 2 is a diagrammatic side elevation of the welding machine showing the feed mechanism; and Figure 3 is a circuit diagram which also shows in plan the parts illustrated in Figure 2.

Referring to Figure 1, 10 represents the moving head of the machine which is recessed to receive a push rod 12 through which motion is transmitted to the moving head. Within the recess 14 is a heavy coil compression spring 16 interposed between the bottom of the recess and a shoulder 18 on the push rod 12. This rod has a second shoulder 20, spaced a short distance away from the rear face of the moving head, so that after the spring has been compressed a certain amount this second shoulder will abut against the moving head whereupon any further movement is communicated positively to the head. An extension 22 of reduced diameter projects from the push rod through a bore 24 at the bottom of the recess 14 and the extremity of this extension carries a nut 26 through which the moving head is retracted when the push rod 12 is moved to the right.

The moving head carries a pair of electrical contacts arms 28, 30 of which the contacts 29 are normally held closed by a spring 32, the arm 28 is fixed to the head, the arm 30 being pivoted. The push rod 12 carries an adjustable stop 34 which, after the coil spring 16 has been compressed by a certain amount, encounters the tail of the pivoted contact arm 30 thereby separating the contacts. The interruption of a circuit containing these contacts brings about the reversal of the feed movement and the backward feed is stopped, and the forward feed resumed, as a consequence of the drop in current in the primary of the welding transformer consequent on the separation of the workpieces.

Referring now to Figures 2 and 3, the right-hand end of the push rod 12 carries a cam follower roller 36 co-operating with a cam 38 mounted on a vertical shaft 40 driven through worm rotation gearing 42 by a reversible electric motor 44. An extension 46 of the push rod carries a second cam follower roller 48 co-operating with a second cam 50 also carried by the cam shaft 40. The contour of the cam 38 is such that steady rotation of the cam removes the push rod to the left at a steady slow rate through the range through which preheating and flashing of the workpieces is to take place, while an abrupt rise in the cam contour brings about the butting movement. The contour of the cam 50, which is used for retracting the moving head, is for the most part complementary to that of the feed cam 38 so that both cams remain in contact with their cam followers in all positions. At or near the position opposite to the butting part of the cam 38 however the cam 50 is cut away or relieved as at this point it is not necessary that this cam should be in contact with the cam follower 48.

The motor 44 is under the control of two motor contactors, namely a forward contactor 52 and a backward contactor 54. The motor circuit is not shown in the drawings; it will be appreciated that this circuit varies in accordance with the type of motor and the kind of electric supply.

To start the machine a switch 56 is manually closed. This switch is arranged so that it is opened at a certain time in the cycle by a cam, as will be described hereinafter, but can be closed by hand at any time. The closing of this switch completes a circuit from one side of the mains at A, through B, through the main contactor coil 58, through a cam-operated cut-out switch 60, switch 56 to the other side of the mains at C. The main contactor is now closed, supplying current to the primary winding of the welding transformer 62. In the circuit of this primary winding is a winding of a relay 64 which however is not energised because, until the secondary winding of the transformer is closed by the meeting of the workpieces, no appreciable current flows through the primary. The closing of the switch 56 also causes the winding 66 of the forward motor contactor 52 to be energised. The circuit is from A, through B, through winding 66, interlock contacts 68 associated with the backward contactor 54, through the contacts 70 of the relay 64, switch 56 and back to C. The closing of the forward contactor completes the motor circuit, the cam shaft 40 is rotated through the worm gear 42, clockwise as seen from above, and the moving head 10 is fed forward, that is to the left in the drawing. When the workpieces 72 meet, current flows through the primary winding of the transformer 62 and the relay winding 64 with the result that the contacts 70 are open and another pair of contacts 74 are closed. The circuit through the forward contactor winding 66, previously maintained closed through the contacts 70, is now maintained through a parallel circuit extending through the contacts 29 and a pair of interlock contacts 76 associated with the forward contactor 52, which were closed when the forward contactor winding 66 was energised.

As the workpieces 72 are cold, the moving head 10 will be arrested but the feed cam 38 will continue to drive the push rod 12 forward against the pressure of the spring 16 with the result that the contacts 29 are opened as previously described. This causes the forward contactor winding 66 to be de-energised and the interlock contacts 76 to be opened. The motor now stops and the forward drive is discontinued. A further pair of contacts 78 are mechanically connected to the forward contactor 52 through a lost motion device so that when the interlock contacts 76 are closed the contacts 78 are opened. When the forward contactor winding 66 is finally de-energised a dashpot 80 or similar device causes a delay in the closing of the contacts 78 and means are provided whereby the duration of this delay can be adjusted. When the contacts 78 finally close, a circuit is completed from A, through B, the winding 82 of the backward motor contactor 54, contacts 78 now closed, switch 56, and back to C. The motor now starts in the reverse direction to separate the workpieces. At the same time the normally closed interlock contacts 68 associated with the backward contactor 54 are opened to ensure against the undesired closing of the forward contactor.

The delay in the closing of the contacts 78 is for the purpose of allowing the workpieces to remain in contact for an appreciable time so that their meeting faces become heated. The time required varies according to the cross-section of the workpieces and other factors and therefore it is desirable to provide the dashpot 80 or other device with means for adjusting the duration of the delay.

As soon as the movement of the push rod 12 is reversed the contacts 29 close, but at present this does not cause the forward contactor winding 66 to be re-energized because the interlock contacts 76 are open. Presently, when the lost motion between the nut 26 and the moving head has been taken up, the workpieces separate thereby de-energising the relay 64, opening the contacts 74 and closing the contacts 70. The opening of the contacts 74 breaks the circuit previously described through the backward contactor winding 82, this contactor opens, the interlock contacts 68 are closed, the motor stops and then starts again in the forward direction immediately because, as the contacts 68 and 70 are now closed, the circuit previously described is re-established through the forward contactor winding 66.

The cycle of operations is now repeated. This alternation of forward and backward feed continues until flashing occurs between the workpieces, when mechanical resistance to forward movement ceases. The contacts 29 are therefore not opened, with the result that the motor is not reversed. The switch 56 is still closed and the forward feed therefore continues.

The contour of the main feed cam 38 is such that after an interval the forward feed is considerably accelerated to bring about the butting of the workpieces. The increased pressure during the butting period causes the contacts 29 to open but this is provided against by a maintaining switch 86 closed by a triple cam 88 fixed to the upper end of the shaft 40, which also operates the switch 56. The maintaining switch 86 is in parallel with the contacts 29. The cut-out switch 60 previously mentioned, which is under the control of the cam 88, is normally closed. This cut-out switch is opened by the cam 88 at the moment of butting, thereby de-energizing the winding 58 of the main contactor thus cutting off the current to the primary winding 62 of the welding transformer. The motor, however, continues running until the motor switch 56 is opened by the cam 88. The circuit through the forward contactor winding 66 is therefore broken and the motor stops. The welded workpieces are now removed from the machine and the switch 56 is closed by hand thereby restarting the motor in the forward direction as previously described. The reverse cam 50 then retracts the moving head. When the cam shaft reaches its initial position, the switch 56 is opened by the cam 88, the motor will stop and the whole of the parts are now in their initial condition, ready for the next welding operation.

It is evident that the contacts 29 could be arranged so that they are normally opened and are closed by the movement described above. Alternatively, these contacts may be replaced by a valve controlling a fluid under pressure, and normally either open or closed, this valve being closed or opened as the case may be as a result of the relative movement between the push rod 12 and the moving head. The delay or time lag in the reversal of the motor may in this case be brought about by providing a gap, preferably adjustable, between the stop on the push rod 12 and the valve member which it operates.

The circuit arrangement described above is generally similar to that described in United States Patent No. 2,298,051. Certain additional and auxiliary devices which have been omitted from the present description and drawings for the sake of clearness will be found described in that prior specification. In particular, motor-operated switches such as are described with reference to Figure 5 of the earlier specification are employed to cause the feed motor to stop more quickly than would otherwise be the case.

I claim:

1. An automatic resistance flash welding machine comprising an electrically operated moving head adapted to carry one of two work pieces, feeding means for alternately bringing together and separating the two work pieces during an initial preheating period, and a resilient mechanism interposed between the feed means and the moving head adapted to effect on compression the stopping and reversing of the forward feeding movement as a consequence of the mechanical resistance offered by the meeting together of the two work pieces.

2. An automatic resistance flash welding machine according to claim 1, wherein the means for stopping and reversing the feed movement includes a pair of electric contacts, actuated as a consequence of the yielding aforesaid to change the condition of a circuit whereby the feeding means is stopped and reversed.

3. An automatic resistance flash welding machine according to claim 1 wherein the resumption of forward feed is brought about by the action of relay mechanism actuated by the drop of welding current consequent on the separation of the workpieces.

WILLIAM HAMMOND MILLWOOD.